US006052796A

United States Patent [19]
Croslin

[11] Patent Number: 6,052,796
[45] Date of Patent: Apr. 18, 2000

[54] METHOD AND SYSTEM FOR AUGMENTING COMMUNICATIONS NETWORK WITH SPARE CAPACITY

[75] Inventor: William D. Croslin, Colorado Springs, Colo.

[73] Assignee: MCI Communications Corporation, Washington, D.C.

[21] Appl. No.: 08/884,716

[22] Filed: Jun. 30, 1997

[51] Int. Cl.⁷ .................................................. G06F 11/00
[52] U.S. Cl. ............................................... 714/4; 370/225
[58] Field of Search ....................... 395/182.02; 370/216, 370/217, 228, 225; 371/20.6

[56] References Cited

U.S. PATENT DOCUMENTS

| | | | |
|---|---|---|---|
| 4,577,066 | 3/1986 | Bimonte et al. | 379/221 |
| 4,920,529 | 4/1990 | Sasaki et al. | 370/218 |
| 5,023,873 | 6/1991 | Stevenson et al. | 395/182.02 |
| 5,146,452 | 9/1992 | Pekarske | 395/182.02 |
| 5,187,740 | 2/1993 | Swaim et al. | 379/209 |
| 5,335,268 | 8/1994 | Kelly, Jr. et al. | 379/112 |
| 5,459,716 | 10/1995 | Fahim et al. | 370/16 |
| 5,463,615 | 10/1995 | Steinhorn | 370/221 |
| 5,550,805 | 8/1996 | Takatori et al. | 370/216 |
| 5,636,203 | 6/1997 | Shah | 370/244 |
| 5,646,936 | 7/1997 | Shah et al. | 370/228 |
| 5,734,811 | 3/1998 | Croslin | 395/182.02 |
| 5,941,992 | 8/1999 | Croslin et al. | 714/4 |
| 5,958,063 | 9/1999 | Croslin et al. | 714/4 |
| 5,999,103 | 12/1999 | Croslin | 370/225 |

FOREIGN PATENT DOCUMENTS 0 494 513 A2  12/1991  European Pat. Off. .
WO 95/10149    4/1995   WIPO .

OTHER PUBLICATIONS

Manione et al. "An Inconsistencies Tolerant Approach in the Fault Diagnosis of Telecommunications Networks" Feb. 14, 1994.

Bouloutas, et al,. "Alarm Correlation and Fault Identification in Communication Networks" Feb. 1, 1994.

Herzberg et al. "The Hop–Limit Approach for Spare–Capacity Assignment in Survivable Networks" IEEE Dec. 3, 1995.

Dighe, et al. "A Link Based Alternative Routing Scheme for Network Restoration under Failure" IEEE May 1995.

Grover et al. "Near Optimal Spare Capacity Planning in a Mesh Restorable Newtork" IEEE Jan. 1991.

Hasegawa et al. "Dynamic Reconfiguration of Digital Cross–Connect Systems with Network Control and Management" IEEE.

Bellary, et al. "Intelligent Transport Network Survivability: Study of Distributed and Centralized Control Techniques" IEEE 1990.

Shimazaki et al. "Neopilot: An Integrated ISDN Fault Management System" IEEE Feb. 1990.

Shimazaki et al. "Network Fault Management" Sep. 1192.

Newport, et al. "Network Survivability Through Connectivity Optimization" IEEE 1987.

(List continued on next page.)

*Primary Examiner*—Robert W. Beausoliel, Jr.
*Assistant Examiner*—Pierre Eddy Elisca

[57] ABSTRACT

A method and system for augmenting a communications network with spare components to efficiently re-route network traffic following a failure of one or more network components. The provisioning system of the present invention identifies components that are not configured into the communications network, but that could be configured into the communications network. The provisioning system identifies restoral routes to bypass a failed network component assuming that each of the identified components were configured into the network. The restoral routes are identified based on cost assigned to the identified components and the component currently configured into the network. The provisioning system then selects those identified components that are frequently used in the restoral routes to be configured into the communications network.

17 Claims, 7 Drawing Sheets

OTHER PUBLICATIONS

Flanagan et al. "Principles and Technologies for Planning Survivability–A Metropolitan Case Study", IEEE 1989.

M. Wehr "Protection of Synchronous Transmission Networks", Commutation and Transmission, No. 4, 1993.

Coan, et al. "Using Distributed Topology Update and Preplanned Configurations to Achieve Trunk Network Survivability" IEEE Oct. 1991.

J. Yamada "A Spare Capacity Design Method for Restorable Networks", IEEE GLOBCOM 95, vol. 2, pp. 931–935, XP000622930.

Herzberg et al "The Hop–Limit Approach for Space–Capacity Assignment in Survivable Networks", IEEE/ACM Transactions on Networking, vol. 3, p. 782 and Fig. 6, XP000544181.

METHOD AND SYSTEM FOR AUGMENTING COMMUNICATIONS NETWORK WITH SPARE CAPACITY

CROSS-REFERENCE TO RELATED APPLICATIONS

This application is related to the U.S. patent applications entitled "Method and System for Assigning Spare Transmission Links to Restoral Routes" and "Method and System for Pre-Patching a Communications Network," which are being filed concurrently and are hereby incorporated by reference.

TECHNICAL FIELD

The present invention relates to communications networks and, in particular, to restoration of communications networks following failure of a network component.

BACKGROUND OF THE INVENTION

Telecommunications carriers (e.g., long distance providers) continually strive to increase the reliability of their communications networks. They do this, in part, by increasing the speed by which they can restore network operation following failure in one or more components of the network. A communications network consists of a collection of transmission links, also known as segments, that are interconnected at network nodes. The segments include transmission lines, fiber optic cables, microwave links, and other such transmission medium. Traffic is transmitted on the network from one endpoint to another endpoint through a current route or "trunk," which is a network path of segments that interconnect the endpoints. The network nodes may serve a variety of finctions such as amplifying the network traffic for transmission down the next segment in the route or establishing an interconnection between two segments connected to the node (i.e., a switch). Segments are interconnected by switching nodes to form "spans." The switching nodes can be controlled locally or from a remote computer system to connect or to disconnect segments that are connected to the node.

Unfortunately, the components (e.g., nodes and segments) of the communications network may occasionally fail. For example, a segment that is a buried fiber optic cable may fail as a result of being inadvertently severed by someone digging near the buried cable. If one or more of the cables fail, massive disruption of services to a large number of network customers could result. Therefore, telecommunications carriers strive to quickly and economically route the network traffic around such failed components by establishing a "restoral" route. A restoral route is a path between the endpoints that does not include the failed component. The establishing of a restoral route generally involves: (1) detecting that a component on the current route has failed, (2) identifying the location of the component, (3) selecting a restoral route to bypass the failed component, and (4) implementing the selected restoral route. The reliability of telecommunication networks depends in large part on the ability to detect such failures and implement the restoral route with minimal impact on network customers. A plan that identifies which switching nodes, also referred to as restoration nodes, are to be switched to bypass one or more specific failed components is called a "restoration plan."

Communications networks typically have excess capacity that can be used to bypass a failed component. The segments of a network that are currently being used to bear traffic are referred to as active segments, and the segments that are not being currently used to bear traffic (i.e., excess capacity) are referred to as spare segments. Spare segments that are currently connected to another form a span are referred to as a spare span. Restoral routes are implemented by identifying spare segments and incorporating certain of those spare segments into the network. Telecommunications carriers desire to use restoral routes that minimize costs and that can be implemented rapidly when a network failure is detected. Telecommunications carriers typically consider the quality, capacity, and length of a restoral route as an indication of the cost of the restoral route. However, telecommunications carries typically do not consider the cost of adding new spare segments when identifying restoration plans. The cost of adding new spare segments (or switching nodes) depends on various factors, such as, the length of the segments, the type of segment (e.g., fiber optic or microwave), and whether the segment is owned or leased. If each active segment of the current route had redundant capacity, then building of restoral routes would be straightforward and very fast. However, the cost of such redundant capacity may be prohibitive. It would be desirable to have a technique in which the cost of such redundant capacity and the cost of building a restoral route could be minimized to reduce overall costs.

SUMMARY OF THE INVENTION

The present invention provides a method and system for identifying segments of a communications network that should be provisioned (e.g., added as spare capacity) so that, in the event of a failure in any one or more of the network components, the network can be restored as efficiently as possible. The provisioning system identifies possible non-existing segments that could be provisioned and then incorporated into the communications network to bypass potential failed components. The provisioning system determines which of these identified non-existing segments could be advantageously provisioned and used in restoring failed components. The determination is based on the costs associated with the provisioning of the segments.

DETAILED DESCRIPTION OF THE INVENTION

The present invention provides a method and system for identifying which spare segments should be added to a communications network to reduce the overall cost of bypassing network failures. The provisioning system of the present invention assigns a cost to each spare segment in the network and a cost to each segment that can be provisioned into the network. The segments that can be provisioned are referred to as artificial segments. The cost of each segment represents the overhead incurred in using the segment in a restoral route to bypass a network failure. The costs of the artificial segments also include the cost of provisioning that artificial segment into the network. The provisioning system then identifies restoral routes to bypass each active segments. These restoral routes may include both spare segments and artficial segments. The provisioning system analyses the restoral routes to determine which artificial segments should be provisioned to reduce the overall cost.

The cost associated with a segment, spare or artificial, can be based on various factors. For example, the cost can be based on the length of a segment, the number of nodes (i e., non-switching nodes) within the segment, the type and quality of the transmission medium (e.g., fiber optic versus microwave), and type of actions (e.g., creation of connections) needed to implement the segment into a restoral route. The segments that are assigned lower costs are selected to be part of a restoral route before segments with higher costs. For example, a spare segment that is a fiber optic cable may be given a lower cost than a segment that is a microwave link, since a fiber optic cable is of higher quality than a microwave link and should be selected first when building a restoral route. Also, segments that are connected to restoration nodes that are located at the same location are given a lower cost than segments that are connected to restoration nodes at different locations. Segments between restoration nodes at the same location should be selected first because the likelihood of an external factor causing a failure is much less than for a segment between different locations and such a segment requires no transmission system. The following table lists sample costs for various types of segments.

| Segment Type | Cost |
| --- | --- |
| single location | 5 |
| dedicated | 10 |
| protected | 80 |
| fiber optic | 500 |
| microwave | 5000 |
| leased | 5010 |

These costs are for a segment of a standard length. As the length of the segment varies from the standard, the cost would vary accordingly. The high value for the microwave and leased segments indicates a preference to use such segments as infrequently as possible (within the overall cost constraints). A dedicated segment has a lower cost than a protected segment because the dedicated segment can only be used for restoration.

Figure 1:
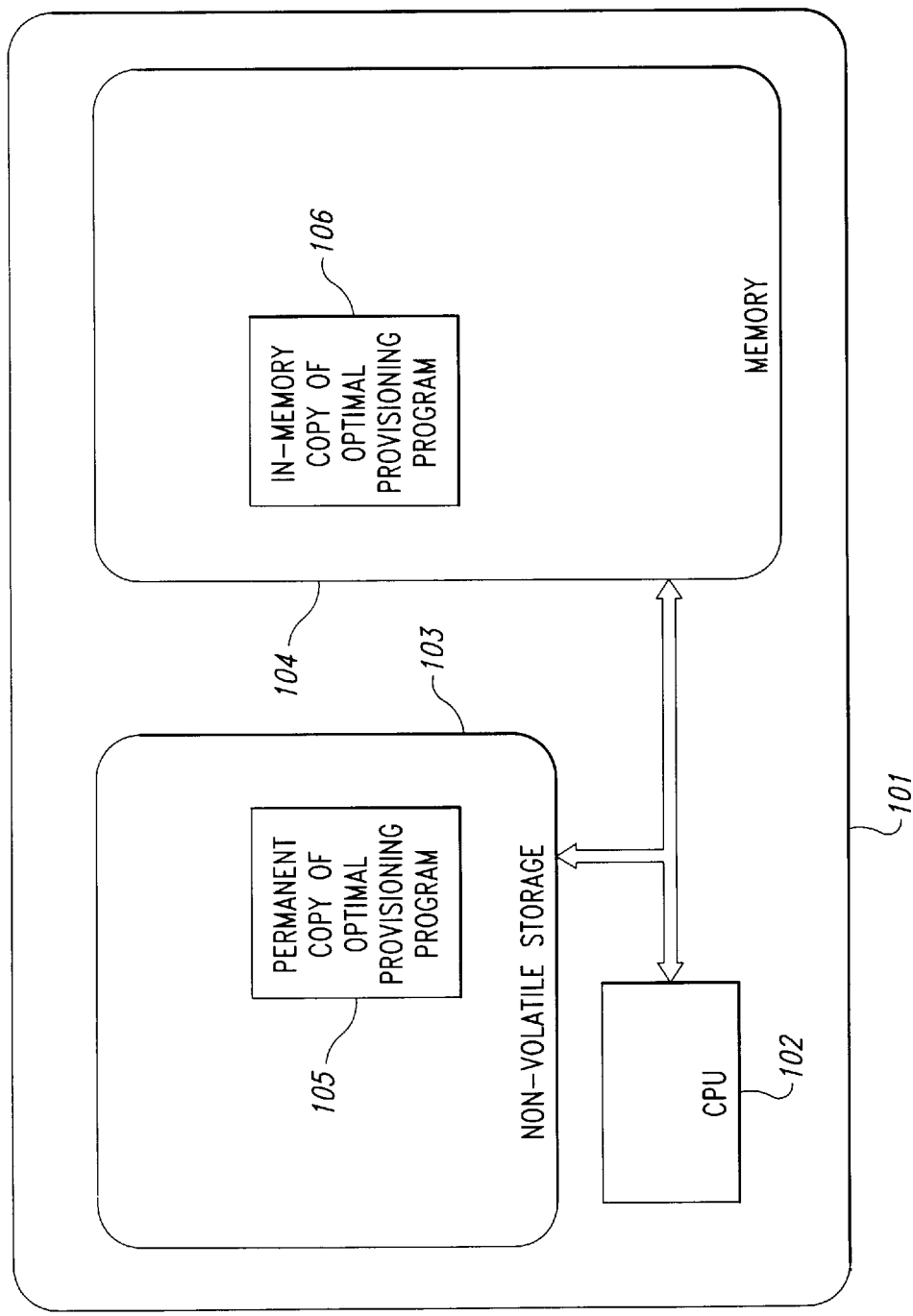
FIG. 1 is a block diagram of a typical computer system for executing the provisioning system.

The provisioning system of the present invention is preferably implemented as a computer program that runs on a computer system. FIG. 1 displays a block diagram of a typical computer system 101. The computer system includes a central processing unit 102, a computer-readable storage device 103 (e.g., CD-ROM), and memory 104. A permanent copy 105 of the computer program that implements the provisioning system is stored on the storage device. The entire program 106, or portions thereof, are transferred to the memory of the computer from where instructions that comprise the program are fetched by the central processing unit and executed in order to implement the provisioning of spare capacity in the communications network.

Figure 2:
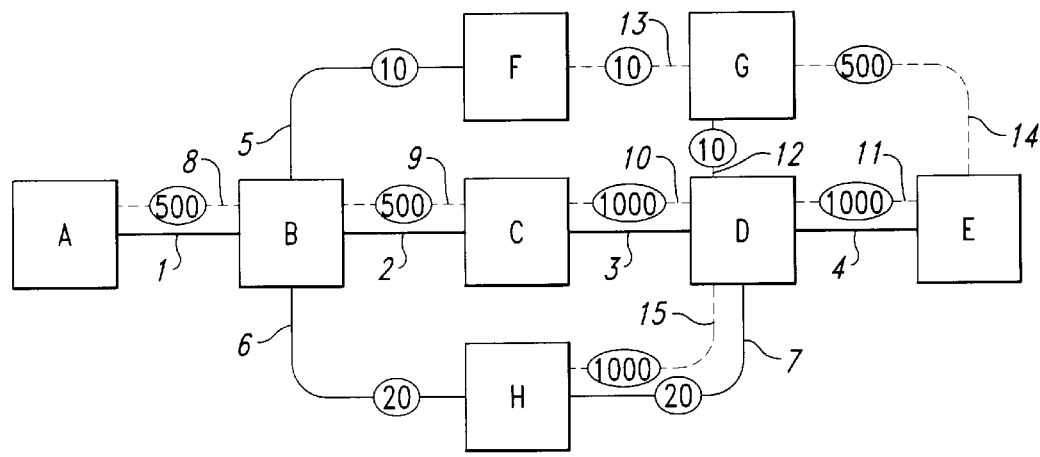
FIG. 2 illustrates an example communications network.

FIGS. 2–11 illustrate the operation of the provisioning system. FIG. 2 illustrates an example communications network. The communications network comprises eight restoration nodes A–H, four active segments 1–4 that comprise the initial route of the network, and three existing spare segments 5–7. The provisioning system initially identifies segments that could be created but currently do not exist in the initial configuration of the network. These non-existing segments are called artificial segments. The artificial segments 8–15 are represented by dashed lines. The provisioning system also assigns costs to each spare segment and artificial segment. The spare segments 5–7 have been assigned costs that are within circles along the lines representing the spare segments. For example, spare segment 6 has an assigned cost of 20. The artificial segments 8–15 have also been assigned costs. For example, artificial segment 8 has been assigned a cost of 500. In one embodiment, the provisioning system establishes an artificial segment between each restoration node. However, if certain artificial segments would not be practical to provision, they can be omitted. Also, each artificial segment could be given standard cost (e.g., 1000) that falls between desirable (i.e., low cost) spare segments and undesirable (i.e., high cost) spare segments. In this way, the desirable spare segments would be selected before the artificial segments, and the artificial segments would be selected before the undesirable spare segments. This example does not include artificial segments between each restoral node and uses varying costs for the artificial segments.

The provisioning system can assign costs to spare segments and artificial segments in a variety of different ways reflecting the priority in which spare segments and artificial segments should be used in implementing restoral routes as described above. Costs can not only reflect efficiency of incorporation but also reflect the quality of signal transmission, the capacity of signal transmission, the number of restoration nodes traversed, and other factors. In the current example, as illustrated in FIG. 2, artificial segments 10 and 11 have the relatively high costs of 1000. Other segments have been assigned lower costs. For example, artificial segment 9 has a cost of 500 and the existing spare segments 5–7 have costs of 10, 20, and 20, respectively. The active segments are not assigned costs because it is presumed that they will be used, when functioning, in restoral routes.

The provisioning system then identifies the least costly restoral route to bypass each active segment. Each restoral route may comprise active segments other than the segment being bypassed, existing spare segments, or artificial segments. The segments chosen for the restoral route are those whose combined cost reduces the overall cost of the restoral route. The provisioning system then counts each artificial segment that is used in each identified least costly restoral route and accumulates these counts in a table.

Figure 3:
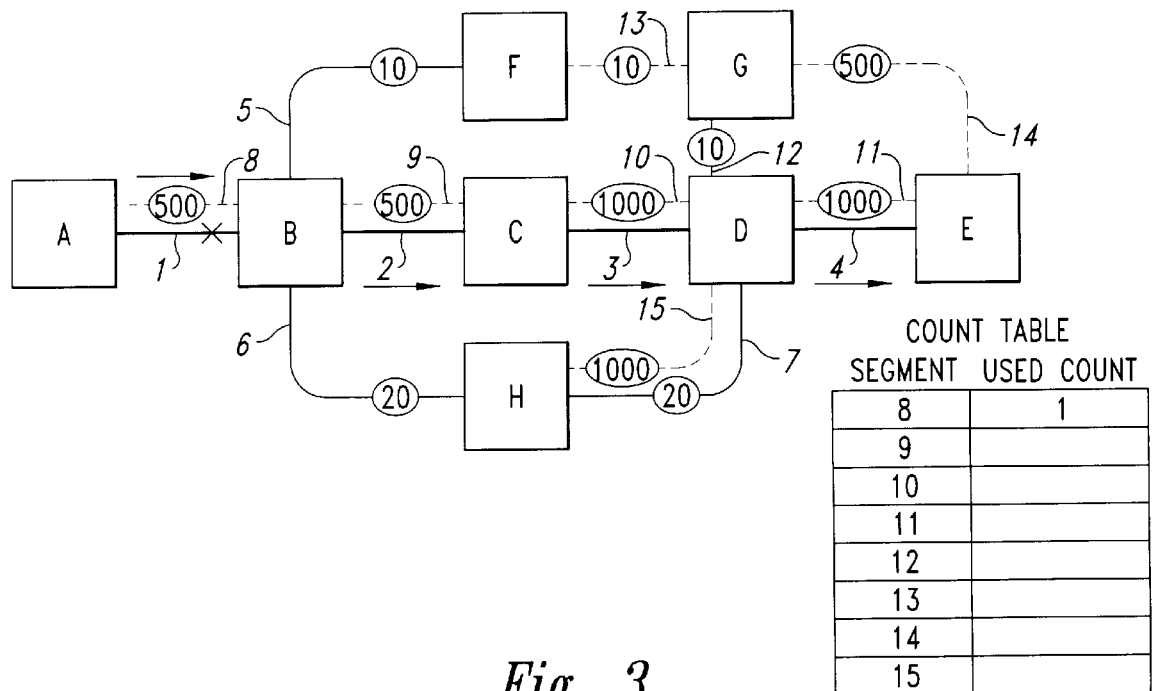
FIG. 3 illustrates the only possible restoral route to bypass active segment 1.
Figure 4:
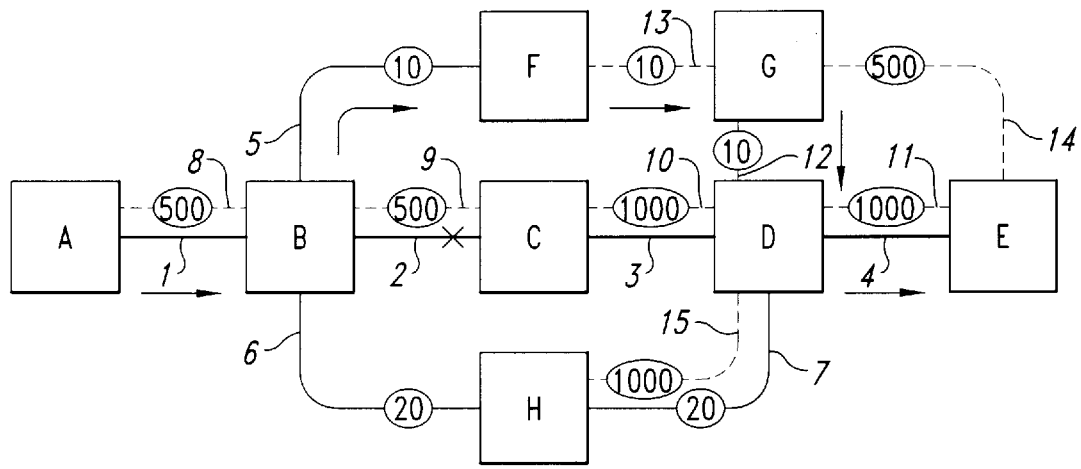
FIGS. 4–8 illustrate possible restoral routes to bypass active segment 2.
Figure 5:
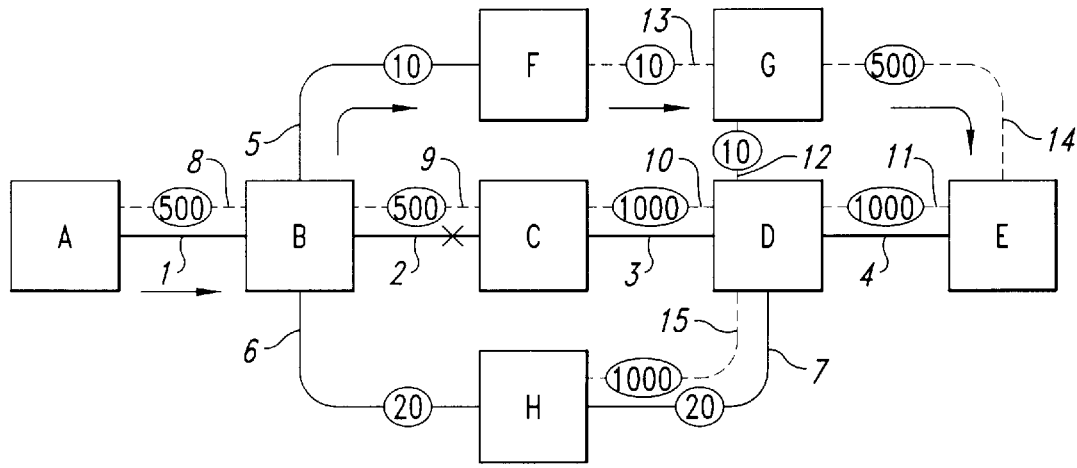
Figure 6:
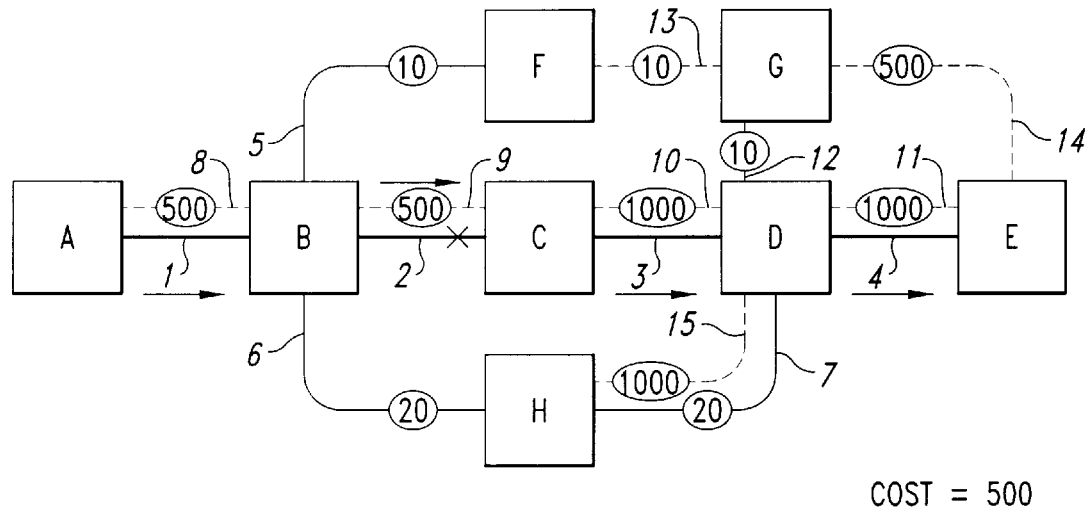
Figure 7:
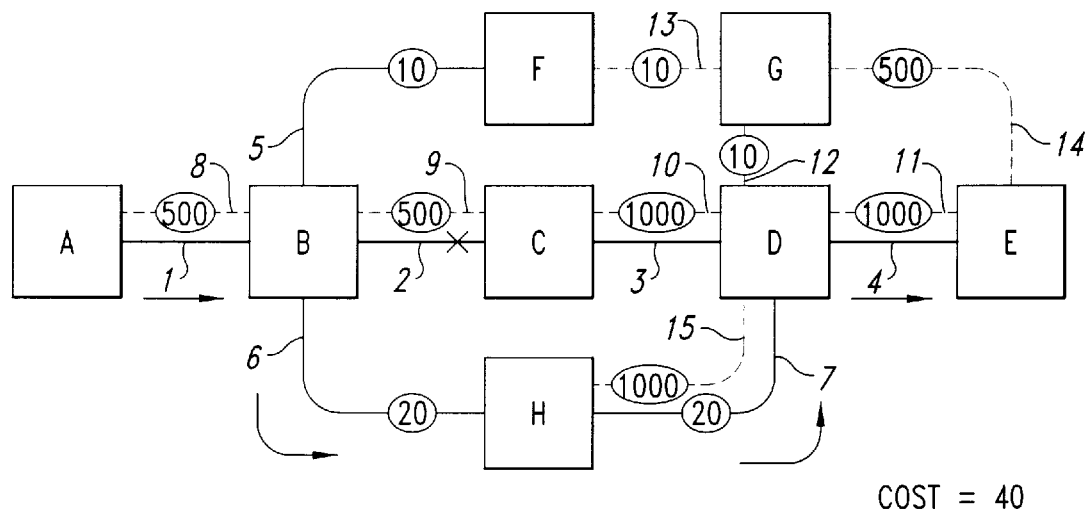
Figure 8:
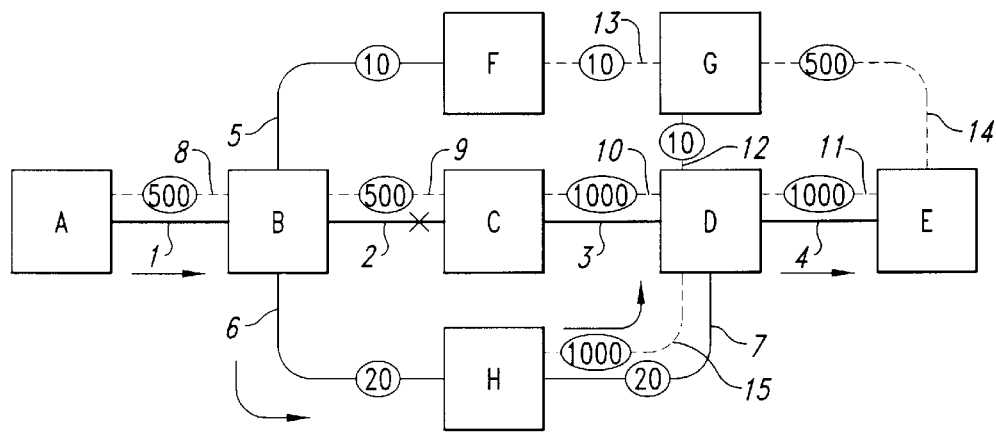

FIG. 3 illustrates the only possible restoral route to bypass active segment 1. The only possible restoral route comprises artificial segment 8 and active segments 2–4 as indicated by the arrows. Artificial segment 8 is selected as part of the restoral route because it is the only segment that can bypass segment 1. The active segments 2–4 are selected because preference is given to active segments. The provisioning system generates an artificial segment count table. Each row of the artificial segment count table represents an artificial segment and contains the count of the number of times that the artificial segment is used in a restoral route generated to bypass an active segment. The provisioning system sets the count for artificial segment 8 used in the restoral route to 1. No counts have been set for the remaining artificial segments.

Figure 9:
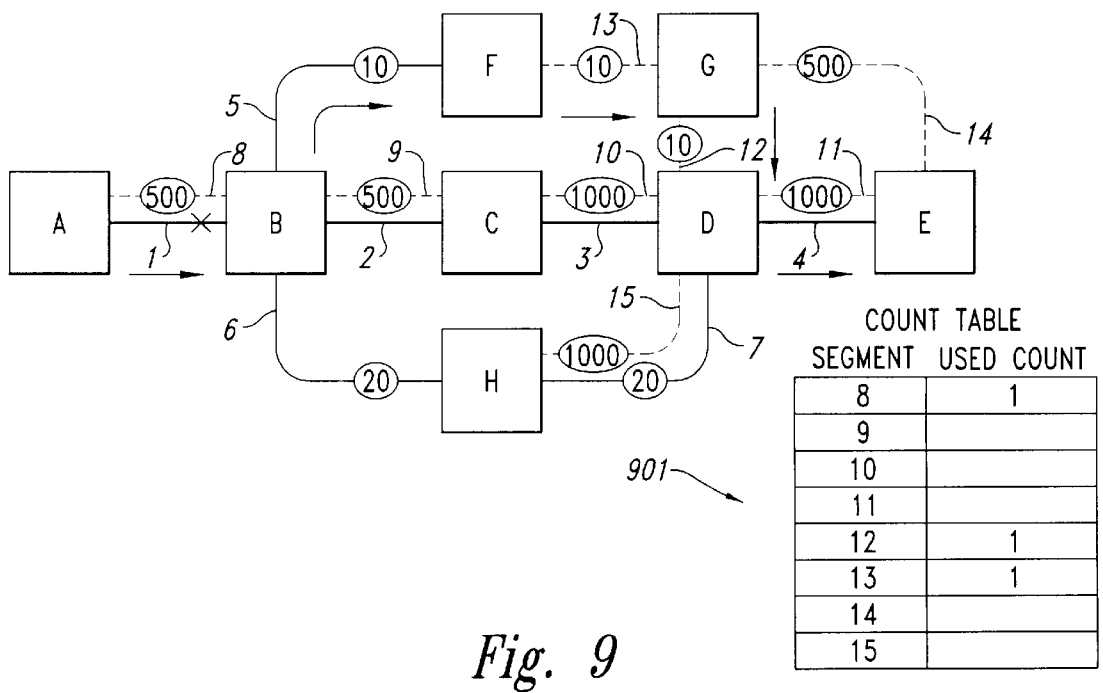
FIG. 9 illustrates this restoral route along with the updated artificial segment count table.

FIGS. 4–8 illustrate possible restoral routes to bypass active segment 2. The restoral route of FIG. 4 comprises active segment 1, existing spare segment 5, artificial segments 13 and 12, and active segment 4 as indicated by the arrows. The cost for this restoral route is 30, which is the sum of the costs of segments 5, 13, and 12. The restoral route of FIG. 5 comprises active segment 1, spare segment 5, and artificial segments 13 and 14 as indicated by the arrows. The cost for this restoral route is 520, which is the sum of the costs of segments 5, 13, and 14. The restoral route of FIG. 6 comprises active segment 1, artificial segment 9, and active segments 3 and 4 as indicated by the arrows. The cost for this restoral route is 500, which is the cost of segment 9. The restoral route of FIG. 7 comprises active segment 1, spare segments 6 and 7, and active segment 4 as indicated by the arrows. The cost for this restoral route is 40, which is the sum of the costs of segments 6 and 7. The restoral route of FIG. 8 comprises active segment 1, spare segment 6, artificial segment 15, and active segment 4 as indicated by the arrows. The cost for this restoral route is 1020, which is the sum of the costs for segments 6 and 15. Since the restoral route of FIG. 4 has the lowest cost, the provisioning system selects that restoral route as the restoral route that it will use to bypass active segment 2. FIG. 9 illustrates this restoral route along with the updated artificial segment count table. The provisioning system has incremented the counts for artificial segments 12 and 13 since these segments are in the restoral route.

Figure 10:
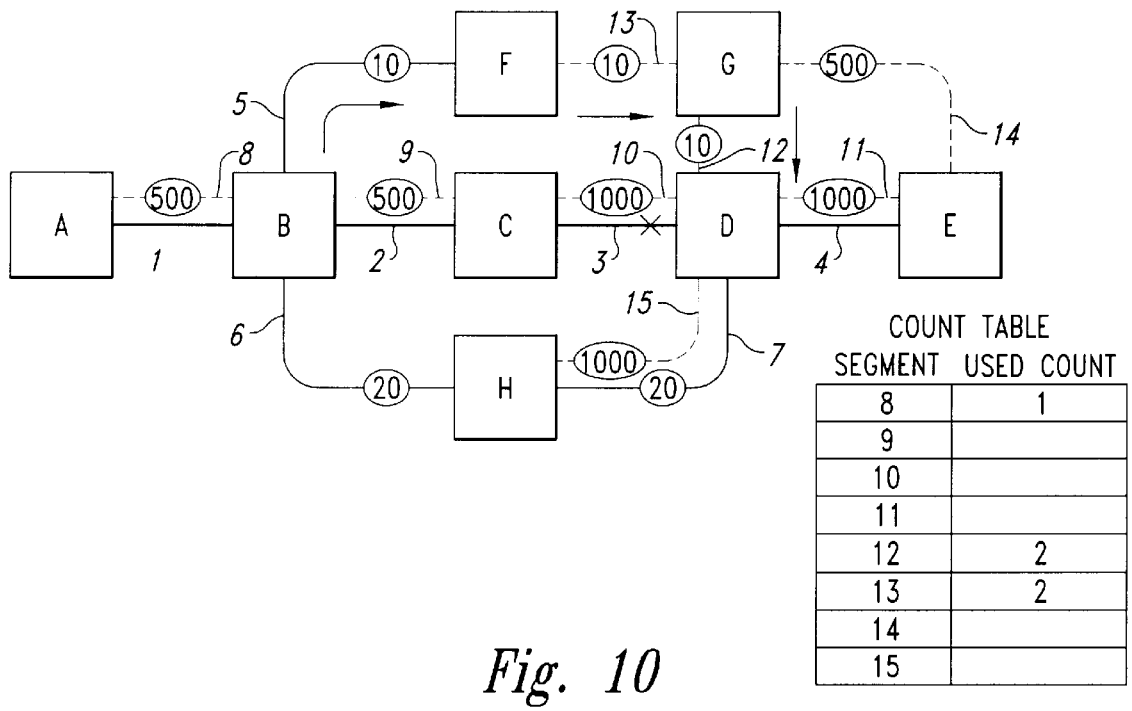
FIG. 10 illustrates the lowest cost restoral route to bypass active segment 3.
Figure 11:
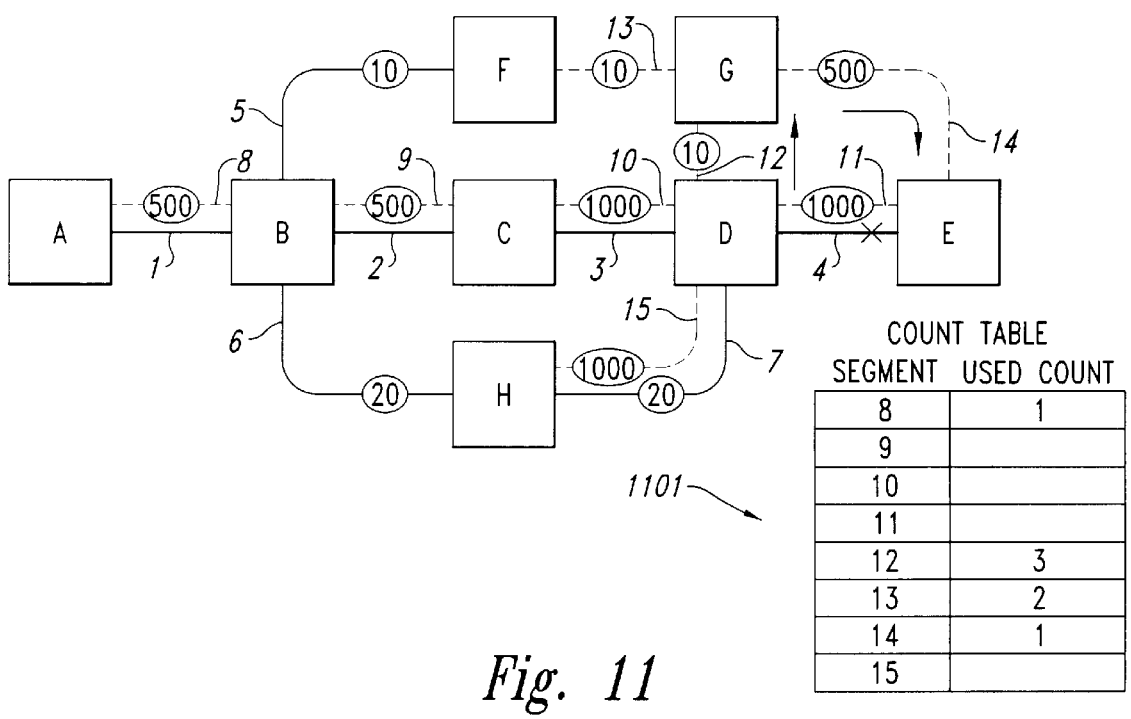
FIG. 11 illustrates the lowest count restoral route to bypass active segment 4.

FIG. 10 illustrates the lowest cost restoral route to bypass active segment 3. The restoral route comprises active segment 1, spare segment 5, artificial segments 13 and 12, and active segment 4 as indicated by the arrows. The cost of this restoral route is 30, which is the sum of the costs of segments 5, 13, and 12. The provisioning system increments the count for artificial segments 12 and 13 in the artificial segment count table. FIG. 11 illustrates the lowest cost restoral route to bypass active segment 4. The restoral route comprises active segments 1, 2, and 3 and artificial segments 12 and 14 as indicated by the arrows. The cost for this restoral route is 510, which is the sum of the costs of segments 12 and 14. The provisioning system increments the count for artificial segments 12 and 14 in the artificial count table. The artificial segment count table of FIG. 11 contains the final counts after all restoration plans have been considered. Artificial segment 12 is used in three different restoration plans, making it a good candidate to be added to the network. Artificial segments 8, 13, and 14 are also used in restoration plans, and, depending on criteria or thresholds established for choosing artificial segments for inclusion in the initial network configuration, may also be candidates for adding to the network. Artificial segments 9–11 and 15 are not used in the restoration plans and are therefore probably not candidates for adding to the network.

The provisioning system may also assign a weighting factor to each restoral route. The provisioning system can use the weighting factor when deciding to provision artificial segments. For example, if an artificial segment is used in only one restoral route, it may not, in general, be cost effective to provision that artificial segment. However, if that restoral route bypasses an active segment with an extremely high priority, then it may be necessary to provision that artificial segment. In one embodiment, the provision system can add the weighting factors of each restoration plan that uses an artificial segment to arrive at a weighted count for the artificial segments. For example, a high priority restoral route may be given a weighting factor of 1000, while a low priority restoral route may be given a weighting factor of 1.

Figure 12:
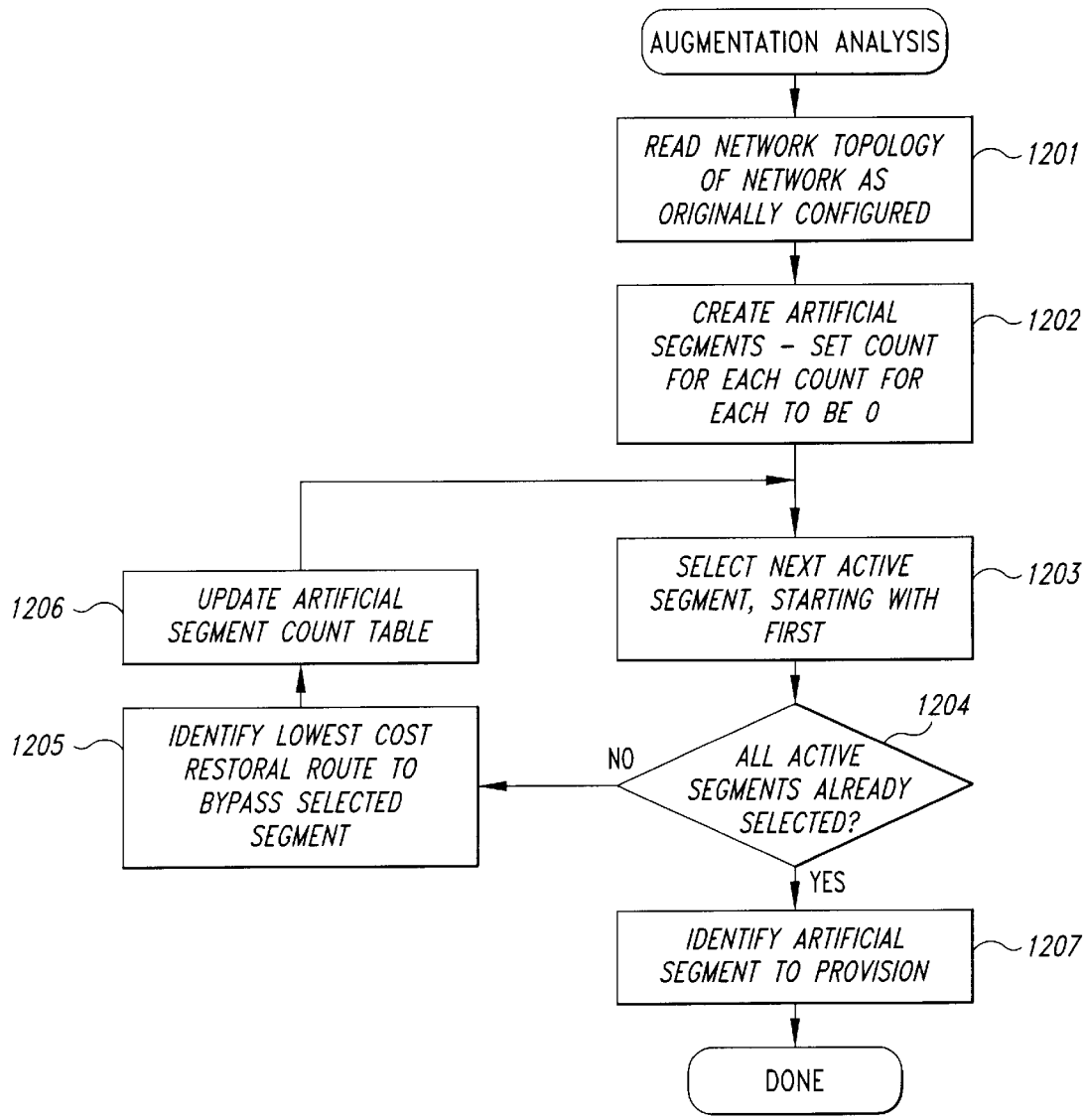
FIG. 12 is a flow control diagram of an implementation of the provisioning system.

FIG. 12 is a flow control diagram of an implementation of the provisioning system. In step 1201, the program reads and analyzes the original network configuration. In step 1202, the program identifies possible artificial segments, assigns costs to spare segments and artificial segments, and initializes the artificial segment cost table. In steps 1203 through 1206, the provisioning system loops determining the least costly restoral route to bypass each active segment. The provisioning system increments the rows in the artificial segment count table for each artificial segment in each determined restoral route. In step 1203, the program selects the next active segment from the initial network configuration starting with the first one. In step 1204, if all the active segments have already been selected, then the program continues at step 1207, else the program continues at step 1205. In step 1205, the program identifies the lowest cost restoral route to bypass that selected active segment. In step 1206, the program updates the artificial segment count table based on the identified restoral route and loops to step 1203 to select the next active segment. In step 1207, the program identifies which artificial segments should be provisioned. The provisioning system may make this determination based strictly on the total count (weighted or not) of the number of times the artificial segment was used in the restoral routes. It may alternatively calculate a percentage and compare that percentage against threshold values.

Although the present invention has been described in terms of one embodiment, it is not intended that the invention be limited to this embodiment Modifications within the spirit of the invention would be apparent to those skilled in the art. For example, the present invention can be used to propose an initial configuration for any type of communications network (e.g., Internet or other computer-based network). Also, the costs assigned to segments can be tuned to effect a balance desired between the cost of provisioning and the cost of restoration. Also, the provisioning system can be operated many times to analyze the effects of various cost structures so that appropriate thresholds can be identified. The scope of the present invention is defined by the claims that follow.

What is claimed is:

1. A method in a computer system for identifying spare capacity to be added to a communications network, the communications network having active segments that carry signals, spare segments that do not carry signals, but that can carry signals if connected to active segments, and switching nodes that connect one segment to another, the method comprising:

defining artificial segments within the communications network that do not exist, but that could be added to the communications network;

assigning a cost to each spare segment and to each artificial segment;

for each active segment in the communications network, identifying a restoral route for the active segment in the communications network, the restoral route comprising active segments, spare segments, and artificial segments connected together in order to transmit signals around the active segment in the event that the active segment were to fail, the restoral route being identified based on the assigned costs; and selecting an artificial segment to be added to the segment based on its usage in the identified restoral routes.

2. The method of claim 1 wherein the selecting of an artificial segment includes counting the number of restoral routes in which each artificial segment is used and selecting the artificial segment with the highest count.

3. The method of claim 2 wherein the counting includes using a weighting factor that reflects the priority of the restoral route.

4. The method of claim 1 wherein the identified restoral route is the restoral route with the lowest assigned cost.

5. The method of claim 1 wherein the assigned cost reflects the relative preferences of using each segment within a restoral route.

6. The method of claim 1 wherein an artificial segment is defined between each pair of switching nodes.

7. A method in a computer system for determining an initial configuration of a communications network, the method comprising:

identifying components that are not currently configured into the communications network, but could be configured in the communications network;

assigning a cost to each of the identified component that reflects relative cost preferences of using the identified components within a restoral route;

generating restoral routes as if the identified components were configured into the communications network; and determining based on usage of the identified components within the restoral routes which of the identified components would be sufficiently valuable in bypassing the failed components to justify configuring the identified component into the communications network.

8. The method of claim 7 wherein the determining of the identified components includes counting the number of restoral routes in which each identified component is used and selecting the identified component with the highest count.

9. The method of claim 8 wherein the counting includes using a weighting factor that reflects the priority of the restoral route.

10. The method of claim 7 wherein the generated restoral routes are the restoral routes with the lowest costs.

11. The method of claim 7 wherein the identified component is an artificial segment defined between a pair of switching nodes.

12. A computer system for determining an initial configuration of a commnunications network, comprising:

a component for identifying artificial segments that are not currently configured into the communications network, but could be configured in the communications network;

generating restoral routes as if the identified artificial segments were configured into the communications network; and determining based on cost usage of the identified artificial segment within the restoral routes which of the identified aricial segments should be configured into the communications network to bypass a failed segment.

13. The computer system of claim 12 wherein the determining of identified artificial segments includes counting the number of restoral routes in which each artificial segment is used and selecting the artificial segment with the highest count.

14. The computer system of claim 13 wherein the counting includes using a weighting factor that reflects the priority of the restoral route.

15. The computer system of claim 12 wherein the identified restoral route is the restoral route with the lowest cost.

16. The computer system of claim 12 wherein the cost of each identified artficial segment reflects the relative preferences of using each artificial segment within a restoral route.

17. The computer system of claim 12 wherein an artificial segment is defined between each pair of switching nodes.

* * * * *